Aug. 31, 1954  R. L. JOHNSON  2,687,590
FILM MOUNT
Filed Oct. 11, 1951
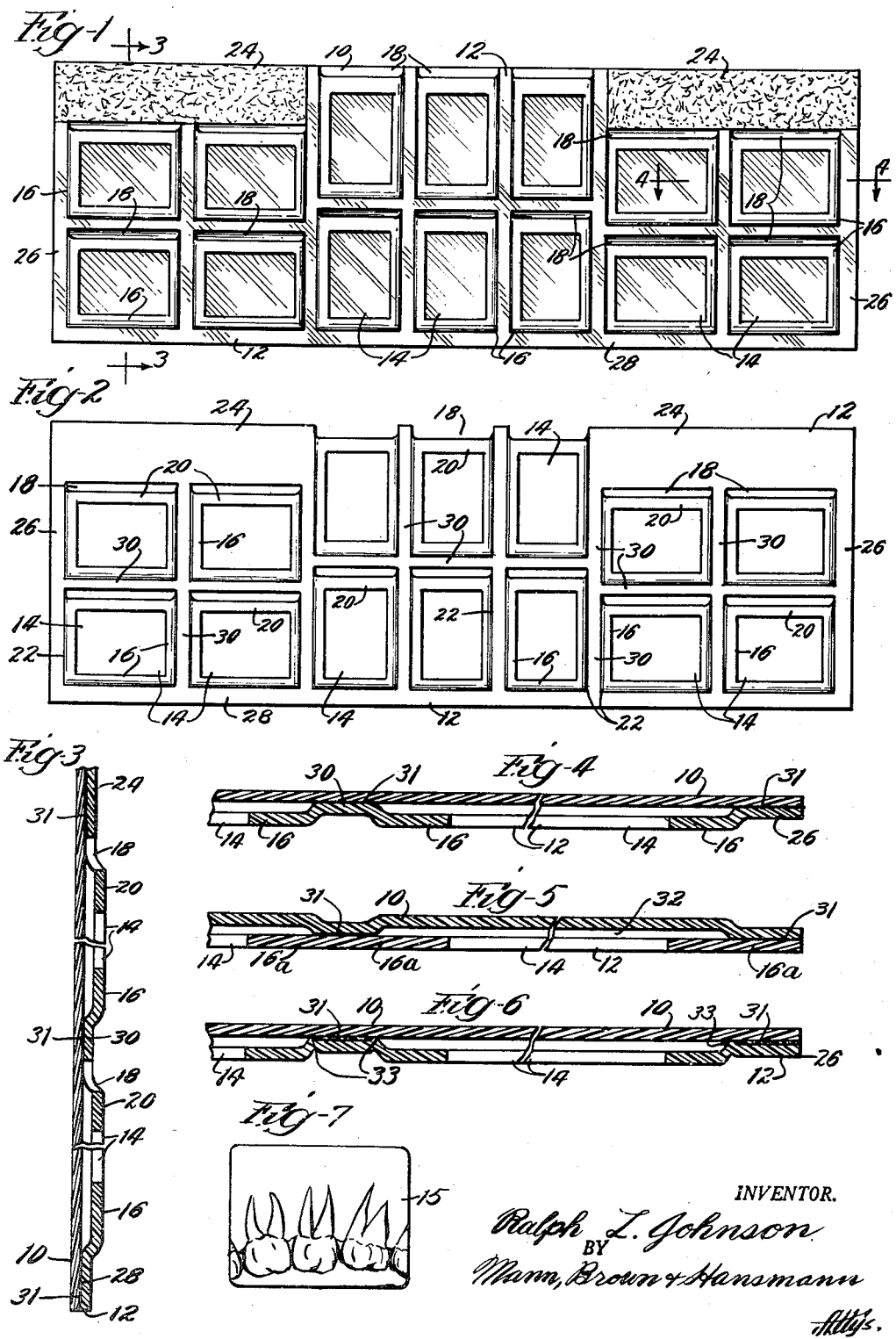
INVENTOR.
Ralph L. Johnson
BY
Mann, Brown & Hansmann
Attys.

Patented Aug. 31, 1954

2,687,590

UNITED STATES PATENT OFFICE 2,687,590

FILM MOUNT

Ralph L. Johnson, Wheaton, Ill., assignor to Johnson & Quin, Chicago, Ill., a copartnership Application October 11, 1951, Serial No. 250,921

1 Claim. (Cl. 40—159)

My invention relates to improvements in film mounts and the like which are used to hold films for display or examination. The film mounts of my invention are particularly useful for holding a group of dental X-ray films, which constitute a complete X-ray presentation of the upper and lower teeth, in such manner that these films may be viewed in the approximate relationship in which the subjects of the films appear in a person's mouth. Such film mounts may also be made of a size to hold one or more X-ray films where a complete X-ray presentation is unnecessary.

One of the objects of my invention is to provide an improved film mount into which the films may be readily inserted and removed, but held in place, in the normal use of the film mount.

Another object of my invention is to provide a film mount which provides ready inspection of all portions of a film held within the mount.

Another object of my invention is to provide a film mount having transparent front and back sheets, one of which is appropriately embossed or up-set to furnish pockets for receiving the films.

A further object of my invention is to provide a film mount in which the adhesive ordinarily used to hold the front and back sheets together is confined between ribs embossed in one of the sheets.

Still another object of my invention is to provide a film mount which is simple and inexpensive to manufacture in quantity production.

In the drawings:

Fig. 1 is a front view of my improved film mount;

Fig. 2 is a front view of the front or top sheet of the film mount showing the film viewing apertures, the embossed panels to frame and hold the films, and the film insertion openings;

Fig. 3 is an enlarged fragmentary cross-section taken along the line 3—3 of Fig. 1;

Fig. 4 is an enlarged fragmentary cross-section taken along the lines 4—4 of Fig. 1;

Fig. 5 is an enlarged fragmentary cross-section similar to Fig. 4 but which shows a modification of my improved film mount in which the rear sheet is embossed to provide pockets for receiving the film and holding it in place;

Fig. 6 is an enlarged fragmentary cross-section similar to Fig. 4, but which shows a modification of the film mount of Figs. 1 and 2, including embossed ribs on the underside of the front sheet for confining the adhesive material in its proper place and preventing such adhesive material from entering the film receiving pockets; and Fig. 7 is a front view of an ordinary dental X-ray film of the type to be used with my film mount.

My improved film mount comprises a back sheet 10 and a front or top sheet 12, both preferably made of transparent acetate or cellulose material. The back sheet may be of a generally rectangular shape and of a size to accommodate the number of films to be included within the film mount.

The front sheet 12 is provided with a plurality of apertures 14 of a size smaller than the films to be held. These apertures provide greater light transmission through the film and an opening through which the film may be contacted to slide it in and out of the film holder for more detailed consideration. In addition, the front sheet 12, as shown more particularly in Fig. 4, is scored and embossed adjacent the sides and bottoms of the apertures 14 to provide raised panel portions 16 which, when the front and back sheets are secured together, form frame members and pockets to receive the side and bottom margins of the film 15 and to hold the film in place between the front and back sheets. The front sheet 12 also has tapered openings 18 spaced from and above the apertures 14 through which openings the films may be inserted when the front and rear portions are secured together. The panel member 20 of the front sheet 12 between the aperture 14 and the opening 18 is also embossed to space this member from the back sheet and serves as the top panel of the pocket to hold the top margin of the film in place when the film is inserted in the pocket. It will be noted that the marginal frame members 16 and 20 surrounding the aperture 14 are embossed and raised slightly from the front sheet, and that portions are cut out of the front sheet to form the apertures 14 and the openings 18. There thus remains in its original flat condition top areas 24 which may be used for patient identification, date of X-ray, doctor's name, or other identifying or advertising media, side strips 26, bottom strip 28, and strips 30 intermediate adjacent embossed panels. When the front and back sheets are brought together these flat areas 24, 26, 28 and 30 of the front sheet will be in contact with and present adhesive areas to secure the front and rear sheets together.

The fabrication of the film mount described above is as follows. Rectangular sheets of appropriate size are cut from flat stock or roll film to provide the back sheet 10. Upon this back sheet a suitable adhesive 31 is then applied by means of a form having raised portions defining the area to which the adhesive is to be applied. These raised portions on the form correspond to the areas 24, 26, 28 and 30 of the front sheet. These raised portions are coated with a layer of adhesive of appropriate thickness in any conventional manner, and the form is then applied to the back sheet transferring strips of adhesive to the back sheet in such manner that these strips will be in register with these adhesive areas of the front sheet when the two sheets are brought together.

Other rectangular sheets for use as front sheets 12 of appropriate size are cut from rolls or flat stock of film. These sheets are then placed in a cutting and embossing die. In this die the portions forming the apertures 14 and the film receiving openings 18 are cut out of the front sheet and the sheet is scored with score lines 22 to facilitate embossing. The panels 16 between the score lines 22 and the edges of the apertures 14 and the panel member 20 are embossed by deforming these portions so that when the sheet is removed from the die the panel members surrounding the aperture are raised slightly from the remainder of the sheet. The front and back sheets are then brought together with the adhesive 31 on the back sheet contacting the flat areas 24, 26, 28 and 30 of the front sheet, and the two sheets are then pressed together in some conventional manner, as by running the sheets between pressure rollers. It will thus be seen, as shown in Figs. 3 and 4, that when the front and back sheets are secured together the embossed panel members 16 and 20 will be spaced from the backing sheet to provide pockets for the ready insertion and removal of the films through openings 18.

In Fig. 5 I have shown a modification of my invention in which the backing sheet 10 is embossed to provide recessed portions 32 and the front sheet is provided with apertures and openings similar to those identified at 14 and 18 in Fig. 2, but in which the sheet is otherwise flat. The recessed portions 32 are of a peripheral size slightly larger than the size of the film to be inserted and of a depth slightly greater than the thickness of the film to be received in the film holder. The apertures 14 of the front sheet are smaller in area than the depressed portion, thus providing panel members which overlap the marginal edge of the film when the film is received in the recessed portions 32. In this modification the recessed areas include all of the area of the backing sheet except that area coated with adhesive 31 as described heretofore in connection with Fig. 1.

In the structure shown in Fig. 5, the films, when inserted through the openings 18, will be received into the recessed portions 32 and the marginal edges of the films will be overlapped by the panel member 16 to hold the films in place.

In Fig. 6 I have shown a modification of the structure shown in Figs. 1 and 2. The front sheet 12 of the structure of Fig. 6 is identical with that shown in Fig. 2 except that when this sheet is placed in the cutting and forming die the sheet, in addition to being scored along lines 22 and embossed to provide marginal frame members 16 and 20, is further embossed to provide ribs 33 on the underside of the front sheet along lines corresponding with the score lines 22. These ribs extend rearwardly a distance approximately equal to the thickness of the front sheet. As pointed out heretofore, the score lines 22 appear on the front sheet substantially in line with the edges of the strips of the adhesive 31 coated on the rear sheet. By embossing these ribs 33 on the underside of the front sheet immediately behind the score lines the ribs serve to separate the adhesive contacting area of the underside of the front sheet from the embossed panel members 16. It is thus apparent that when the front sheet of the film mount is brought into contact with the adhesive coated back sheet, the ribs 33 on the underside of the front sheet will first contact the back sheet at the side edges of the strips of adhesive, and as the sheets are pressed together these ribs will confine the adhesive within its proper space and prevent any excess adhesive from being squeezed out into the space intended to receive the edges of the films.

It will thus be seen that I have provided an improved pocketed film holder having transparent front and back sheets which permit the whole of the film to be viewed without removing the films from the holder. I have also provided a two-sheet film holder having pockets to receive the films and into which pockets the films may be readily inserted and removed. In the structure shown in Fig. 6 I have provided a film mount in the assembly of which the adhesive is positively confined to the area in which the adhesive contact is to be made, and the adhesive is positively prevented from being squeezed into the film receiving pockets.

While there is shown and described herein certain structures illustrating the invention, it is to be understood that the invention is not limited thereto or thereby but may assume numerous other forms and includes all modifications, variations and equivalents coming within the scope of the following claim.

I claim:

A film mount for dental X-rays and the like comprising a flat back sheet of transparent material, a front sheet also of transparent material bonded by adhesive material to the back sheet at spaced points to provide a laminated structure, said front sheet having a plurality of X-ray picture-receiving pockets formed therein by embossing outwardly portions of said sheet, at least one such picture-receiving pocket being substantially rectangular in form and being defined on three sides by straight-line junctures of said substantially rectangular embossment with the unembossed portion of said front sheet, said front sheet having parallel side ribs formed on the back face thereof and surrounding said pocket, said ribs confining said adhesive material to the desired bonding area between said ribs to provide a picture-viewing space, the central portion of said one rectangular embossment being cut away in the offset embossed area to provide a window, and a picture-receiving slot on the fourth side of said rectangular embossment, said fourth side being the side above the rectangular embossment, said slot having substantial width in plan projection and being defined at one side by the juncture of said one rectangular embossment with the adjacent unembossed portion of the front sheet and being defined on the opposite side by a line extending through said offset embossed area of said rectangular embossment to thereby extend substantially throughout the inclined portion between the embossed and unembossed portions of said front sheet, the unembossed portions of said front sheet immediately adjacent to said junctures being firmly bonded to said back sheet.

References Cited in the file of this patent

UNITED STATES PATENTS

| Number | Name | Date |
|---|---|---|
| 143,878 | Caterson | Oct. 21, 1873 |
| 522,484 | Odgers | July 3, 1894 |
| 2,149,488 | Ainsworth | Mar. 7, 1939 |
| 2,385,541 | Rinn | Sept. 25, 1945 |
| 2,421,503 | Hermon | June 23, 1947 |

FOREIGN PATENTS

| Number | Country | Date |
|---|---|---|
| 332,929 | France | Nov. 11, 1903 |
| 276,178 | Great Britain | Aug. 25, 1927 |
| 382,105 | Great Britain | Oct. 20, 1932 |